United States Patent
Horiguchi et al.

(10) Patent No.: US 7,551,388 B2
(45) Date of Patent: Jun. 23, 2009

(54) FALL DETECTION DEVICE AND MAGNETIC DISK DRIVE

(75) Inventors: Chikahiro Horiguchi, Kusatsu (JP); Jun Tabota, Toyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 9 days.

(21) Appl. No.: 11/759,393

(22) Filed: Jun. 7, 2007

(65) Prior Publication Data

US 2008/0001607 A1 Jan. 3, 2008

Related U.S. Application Data

(63) Continuation of application No. PCT/JP2005/019104, filed on Oct. 18, 2005.

(30) Foreign Application Priority Data

Dec. 9, 2004 (JP) ............................. 2004-357404

(51) Int. Cl.
*G11B 21/02* (2006.01)
(52) U.S. Cl. .................... 360/75; 360/77.02; 360/78.04
(58) Field of Classification Search ................. None
See application file for complete search history.

(56) References Cited

U.S. PATENT DOCUMENTS

| | | | | |
|---|---|---|---|---|
| 4,764,755 A | * | 8/1988 | Pedtke et al. ................. | 340/541 |
| 4,864,437 A | * | 9/1989 | Couse et al. .................. | 360/75 |
| 4,985,835 A | * | 1/1991 | Sterler et al. ................. | 701/46 |
| 5,483,451 A | * | 1/1996 | Ohmae et al. ................. | 701/46 |
| 5,490,067 A | * | 2/1996 | Teguri et al. ................. | 701/46 |
| 5,541,842 A | * | 7/1996 | Gioutsos et al. ............... | 701/45 |
| 5,608,628 A | * | 3/1997 | Drexler et al. ................ | 701/45 |
| 5,654,840 A | * | 8/1997 | Patton et al. .................. | 360/75 |
| 5,835,298 A | * | 11/1998 | Edgerton et al. .............. | 360/75 |
| 6,243,633 B1 | * | 6/2001 | Kanameda et al. ............ | 701/45 |
| 6,407,876 B1 | * | 6/2002 | Yamaguchi et al. ........... | 360/75 |

(Continued)

FOREIGN PATENT DOCUMENTS

JP 06-324067 A 11/1994

(Continued)

OTHER PUBLICATIONS

Official Communication for PCT Application No. PCT/JP2005/019104; mailed on Jan. 24, 2006.

(Continued)

*Primary Examiner*—Hoa T Nguyen
*Assistant Examiner*—Dismery E Mercedes
(74) *Attorney, Agent, or Firm*—Keating & Bennett, LLP (57) ABSTRACT

An acceleration sensor outputs a signal in accordance with acceleration. A differentiator outputs a differential signal of the output signal. A comparator inverts the state of an output when the differential signal goes beyond a threshold. A monostable multivibrator maintains the state-inverted signal of the output for a predetermined period of time. An integrator integrates the acceleration detection signal. A comparator inverts the state of an output signal when an integrated signal goes beyond a threshold. A fall determination processor outputs a signal out indicating that a fall has been detected in a situation in which, when the output of the monostable multivibrator is active, the state of the output of the comparator is inverted.

7 Claims, 8 Drawing Sheets

U.S. PATENT DOCUMENTS

| | | | |
|---|---|---|---|
| 6,429,990 B2* | 8/2002 | Serrano et al. | 360/60 |
| 6,597,532 B1* | 7/2003 | Usui et al. | 360/97.03 |
| 6,714,847 B2* | 3/2004 | Ota | 701/46 |
| 6,738,214 B2* | 5/2004 | Ishiyama et al. | 360/75 |
| 6,967,804 B1* | 11/2005 | Codilian | 360/75 |
| 6,999,260 B2* | 2/2006 | Abe et al. | 360/60 |
| 2002/0043114 A1* | 4/2002 | Fujino et al. | 73/862.68 |
| 2003/0074137 A1 | 4/2003 | Ota | |
| 2004/0117089 A1* | 6/2004 | Grotendiek et al. | 701/45 |
| 2004/0125493 A1 | 7/2004 | Shimotono et al. | |
| 2004/0240098 A1* | 12/2004 | Ito et al. | 360/75 |
| 2005/0099719 A1* | 5/2005 | Katai et al. | 360/75 |

FOREIGN PATENT DOCUMENTS

| | | |
|---|---|---|
| JP | 08-221886 A | 8/1996 |
| JP | 11-045530 A | 2/1999 |
| JP | 2000-241442 A | 9/2000 |
| JP | 2000-298136 A | 10/2000 |
| JP | 2002-019570 A | 1/2002 |
| JP | 2002-247153 A | 8/2002 |
| JP | 2003-089341 A | 3/2003 |
| JP | 2004-146036 A | 5/2004 |
| JP | 2004-309162 A | 11/2004 |

OTHER PUBLICATIONS

Official communication issued in counterpart Korean Application No. 10-2007-7012781, mailed on Apr. 15, 2008.

* cited by examiner

FALL DETECTION DEVICE AND MAGNETIC DISK DRIVE

BACKGROUND OF THE INVENTION

1. Field of the Invention

The present invention relates to a fall detection device for detecting whether a device is falling or not on the basis of acceleration, and a magnetic disk drive including the same.

2. Description of the Related Art

Devices for detecting whether a device is falling or not are disclosed in Japanese Unexamined Patent Application Publication No. 2000-241442 (Patent Document 1), Japanese Unexamined Patent Application Publication No. 08-221886 (Patent Document 2), and Japanese Unexamined Patent Application Publication No. 2000-298136 (Patent Document 3).

A fall detection device described in Patent Document 1 detects whether the device is falling based on whether a differential output signal of a detection signal of an acceleration sensor is substantially 0.

A device described in Patent Document 2 obtains a speed signal by integrating an output signal of an acceleration sensor once and, when the speed is greater than or equal to a reference, it is determined that the device is falling.

A device described in Patent Document 3 determines whether or not the device is falling based on an output of an acceleration sensor, a speed signal generated by integrating the output once, and a distance signal generated by integrating the output twice.

The structure shown in Patent Document 1 requires that a detected acceleration be substantially 0. Thus, an acceleration sensor that can detect direct-current acceleration (DC acceleration) is essential. The DC acceleration output must be adjusted to be substantially 0 or less in the case of 0G application (i.e., at the time of a fall). At the same time, the DC acceleration output must also be adjusted to be substantially 0 or less regardless of external factors, such as temperature and humidity, or aging. Therefore, the acceleration sensor and a circuit using the same are complicated and expensive.

The device described in Patent Document 2 obtains the speed of falling by integrating acceleration once (linear integration) and determines whether the device is falling on the basis of whether the speed is greater than or equal to a reference. The device described in Patent Document 3 detects a fall based on DC acceleration, a speed signal generated by integrating a DC acceleration output once, and a distance signal generated by integrating the output twice. In either case, as will be described later, there are many detection errors, such as falsely detecting as a fall a change in the tilt of a mobile apparatus containing the fall detection device.

More specifically, when the tilt of the direction of an acceleration detection axis relative to the direction of acceleration of gravity changes by $\theta$, the output changes by $(1-\cos\theta)$. For example, even when the acceleration detection axis, which is directed along the direction of acceleration of gravity, becomes tilted by about 90° relative to the direction of acceleration of gravity, a "fall" is detected.

In Patent Document 3, the output of the acceleration sensor when the device is falling must be at least adjusted to be equal to or less than a threshold, and the sensor output must also be set to 0.2 G or less regardless of external factors, such as temperature and humidity, or aging.

These restrictions prevent a reduction of the cost of the device.

The device described in Patent Document 1 determines that the device is falling when a state in which both the differential output of the acceleration detection signal and the acceleration detection output are substantially 0 continues for a predetermined period of time. However, the differential output is output instantaneously for the acceleration of gravity induced on the acceleration sensor at the start of a fall, and thereafter, the differential output converges to 0 in accordance with a time constant of a differentiator. Therefore, the fall determination is delayed by the amount of the time constant.

In the case that DC acceleration must be detected, as in Patent Document 1 and Patent Document 3, the direction of acceleration applied to the acceleration sensor must be detected to determine whether the acceleration is DC acceleration or not. In an environment in which it is impossible to detect the falling direction of a device to be detected, accelerations in the directions of three axes that are perpendicular to one another must be detected. A magnetic disk drive, such as a hard disk drive, is sensitive to acceleration in a vertical direction relative to a recording surface of a magnetic disk, and thus, it is only necessary to detect a fall in that direction. However, the above-described method of detecting DC acceleration theoretically requires three acceleration sensors and a circuit for processing sensor outputs, resulting in an expensive system.

SUMMARY OF THE INVENTION

To overcome the problems described above, preferred embodiments of the present invention provide a fall detection device that does not require detection of DC acceleration and that improves fall detection, and a magnetic disk drive including the same.

A fall detection device according to a preferred embodiment of the present invention includes an acceleration sensor that outputs a signal in accordance with acceleration, a differentiator arranged to differentiate an output signal of the acceleration sensor, an integrator arranged to integrate the output signal of the acceleration sensor, and a state determination processor arranged to determine whether the output signal of the acceleration sensor is in a specific state in which a differential signal goes beyond a predetermined threshold and an integrated signal obtained by the integrator goes beyond a predetermined threshold.

For example, three acceleration sensors maybe arranged such that acceleration detection directions thereof are directed along three axes that are perpendicular or substantially perpendicular to one another. The state determination processor may determine whether each of the output signals of the three acceleration sensors is in the specific state. The fall detection device may further include a detection result output processor arranged to output a signal indicating a fall when the state determination processor determines that any one of the output signals of the three acceleration sensors is in the specific state.

The integrator may perform integration once or twice, for example.

The acceleration sensor maybe, for example, a piezoelectric acceleration sensor that generates a piezoelectric effect in response to stress according to the acceleration.

The integrator starts integration at the time the differential signal goes beyond the predetermined threshold.

A magnetic disk drive according to another preferred embodiment of the present invention includes a fall detection device including any of the structures described above, a head that reads or writes data relative to a magnetic disk, and head evacuation unit for evacuating the head to an evacuation area when the fall detection device detects a fall.

Since a fall is detected by determining whether or not a differential signal and an integrated signal of an output signal of an acceleration sensor go beyond associated predetermined thresholds, an acceleration sensor that can detect DC acceleration need not be used, to thereby reduce the cost.

Since it is unnecessary to wait for a differential output to converge, the time required to detect a fall is reduced, as compared to the case in which a fall is detected when the state in which both the differential output and the acceleration output are substantially 0 continues for a predetermined period of time.

Since an acceleration of 0 need not be detected, accelerations in the directions of three axes that are substantially perpendicular to one another need not be detected. An acceleration sensor is arranged such that acceleration in a desired detection axis direction can be detected, and a fall is detected on the basis of an output signal of the acceleration sensor. Thus, accelerations need not be detected separately in the directions of three axes. In this case, only a direction that is substantially perpendicular to the axis of acceleration detection direction defines an insensitive axis. Nonetheless, a fall can be detected provided that the direction of applied acceleration differs from the insensitive axis. Therefore, the cost is reduced.

By arranging three acceleration sensors such that acceleration detection directions thereof are directed along three axes that are perpendicular or substantially perpendicular to one another, and by determining whether each of the output signals of the three acceleration sensors is in the specific state (the state in which both the differential signal and the integrated signal go beyond the associated predetermined thresholds), there is no insensitive axis, and thus, falls in all directions can be detected.

When the integrator performs integration once, whether the speed goes beyond a predetermined threshold defines one condition. When the integrator performs integration twice, whether the displacement goes beyond a predetermined threshold defines one condition. When the former "speed" defines one condition, the integrated output changes relatively quickly, and thus, the responsiveness of fall detection is improved. When the latter "displacement" defines one condition, the probability of false detection in which the movement of the device within a relatively short distance is falsely detected as a fall is further reduced.

Since the acceleration sensor is a piezoelectric acceleration sensor, a small, low-cost fall detection device can be constructed.

By allowing the integrator to start integration at the time the differential signal goes beyond the predetermined threshold, as compared to the case in which integration is performed for all times with a predetermined time constant, the device is less likely to be affected by the low-frequency oscillation or rotation of the device. Accordingly, correct fall detection can be performed.

Since the magnetic disk drive includes the fall detection device and, when a fall is detected, the head is evacuated from the magnetic disk, the magnetic disk drive is protected when a fall of a mobile apparatus including the magnetic disk drive. Since only a small number of detection errors occur, the problem of reduction in the access response speed of the magnetic disk drive in operation is solved.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

The structure of a fall detection device according to a first preferred embodiment of the present invention will be described with reference to FIGS. 1 to 7.

Figure 1:
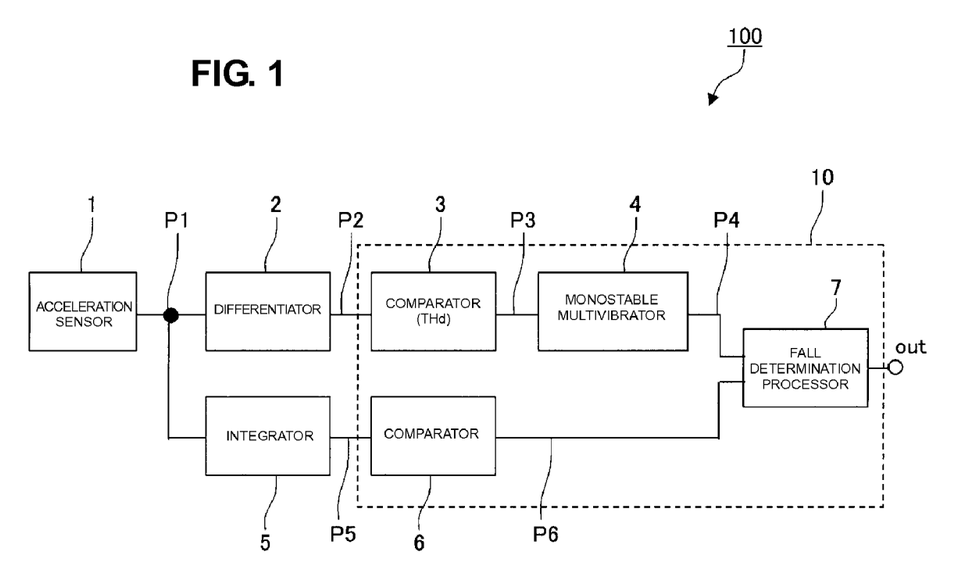
FIG. 1 is a block diagram of the structure of a fall detection device according to a first preferred embodiment of the present invention.

FIG. 1 is a block diagram of the structure of the fall detection device. An acceleration sensor 1 preferably is a piezoelectric acceleration sensor that generates a piezoelectric effect in response to stress according to acceleration. An output signal P1 of the acceleration sensor 1 is output as a voltage signal that is proportional to acceleration within a predetermined detectable range. Since the acceleration sensor 1 preferably is a piezoelectric acceleration sensor, the output signal P1 does not include a DC component or a very low frequency component signal. In other words, the acceleration sensor 1 does not detect DC acceleration.

A differentiator 2 is a circuit that differentiates the output signal P1 of the acceleration sensor 1 and outputs a differential signal P2. The differentiator 2 preferably includes, for example, an operational amplifier and a CR time constant circuit. Since the differential signal P2 is a differential signal of an acceleration signal, the differential signal P2 is a signal that corresponds to acceleration.

A comparator 3 compares the differential signal P2 with a predetermined threshold THd set in advance, and when the differential signal P2 goes beyond the threshold THd, inverts the state of an output signal P3. The output signal P3 of the comparator 3 is a logical-level signal, that is, a signal at either a high level (Hi) or a low level (Lo).

A monostable multivibrator 4 outputs a signal P4 that maintains its state for a predetermined period of time after the time at which the state of the output signal P3 of the comparator 3 is inverted from a normal state.

An integrator 5 is a circuit that integrates the output signal P1 of the acceleration sensor 1 twice and outputs an integrated signal P5. The integrator 5 includes two integrating circuits, each having an operational amplifier and a CR time constant circuit. Since the integrated signal P5 is generated by integrating the output signal P1 of the acceleration sensor twice, the integrated signal P5 is a signal that corresponds to the position (displacement) of the device.

A comparator 6 compares the integrated signal P5 of the integrator 5 with a predetermined threshold THi set in advance, and when the integrated signal P5 goes beyond the threshold THi, inverts the state of an output signal P6. The output signal of the comparator 6 is a logical-level signal.

A fall determination processor 7 determines whether the device is falling or not based on the output signal P4 of the monostable multivibrator 4 and the output signal P6 and outputs an output signal out. The fall determination processor 7 determines whether the state of the output signal P4 of the monostable multivibrator 4 is inverted from the normal state and whether the output signal P6 of the comparator 6 is in a state (specific state) in which the integrated signal P5 goes beyond the threshold THi. In the specific state, the fall determination processor 7 determines that the device is falling and outputs a signal at a logical level in accordance with the determination.

Next, waveforms obtained at the elements of the fall detection device shown in FIG. 1 and the operation of the fall determination processor 7 will be described with reference to FIGS. 2A to 2D.

Figure 2A:
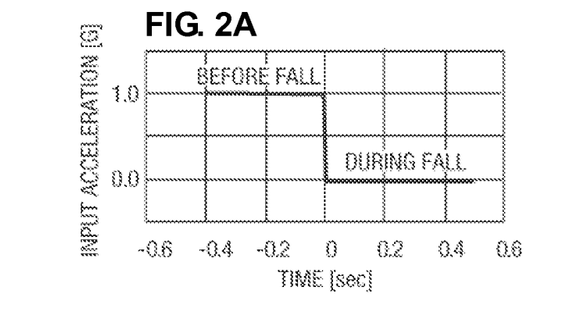
FIGS. 2A to 2D include charts of waveforms obtained at elements shown in FIG. 1 at the time the device is falling.

FIG. 2A is a chart showing acceleration change with time, which is applied to the acceleration sensor 1. The time is plotted along the abscissa, and the input acceleration is plotted along the ordinate. In this case, the time at which a fall starts is denoted as 0.

Figure 2B:
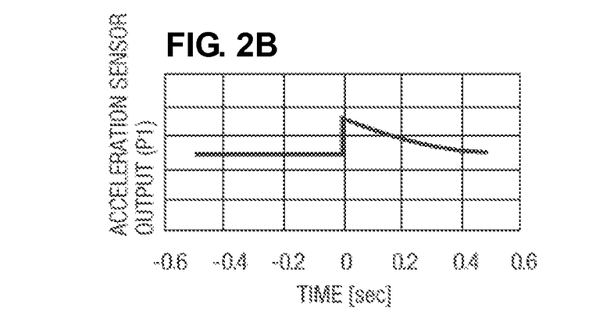
Figure 2C:
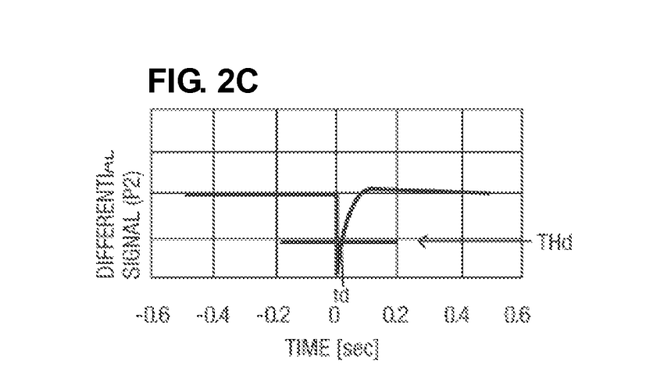

FIG. 2B shows the waveform of the output signal P1 of the acceleration sensor 1 shown in FIG. 1. FIG. 2C shows the waveform of the output signal (differential signal P2) of the differentiator 2 shown in FIG. 1. In this case, acceleration in the falling direction is denoted as the upward direction of the axis of ordinates. The output signal P1 of the acceleration sensor 1 rises at the instant the device starts falling and then gradually decreases with a time constant defined by the circuit structure of the acceleration sensor 1. Therefore, the differential signal P2 falls at the instant the device starts falling and, immediately thereafter, increases with the time constant of the differentiator 2. In this case, the direction of acceleration in the falling direction is denoted as the downward direction of the axis of ordinates.

During a free-fall, the absolute value of the differential signal P2 goes beyond the threshold THd. In other words, the threshold THd is set such that the differential signal P2 of the differentiator 2 goes beyond the threshold THd during a free-fall.

Figure 2D:
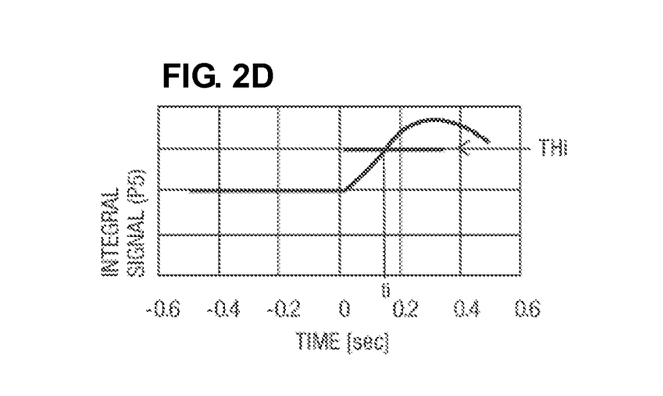

FIG. 2D is a waveform chart of the output signal (integrated signal) P5 of the integrator 5 shown in FIG. 1. This signal has a waveform generated by integrating the output signal P1 of the acceleration sensor 1 shown in FIG. 2B twice. The signal shown in FIG. 2D shows changes in accordance with a parabola (quadratic curve) as the device starts falling and goes beyond the predetermined threshold THi. Thereafter, the amplitude of the signal decreases again in accordance with the time constant of the integrator.

In this example, the signal goes beyond the threshold THi after about 0.15 s have elapsed since the start of the fall. In other words, the threshold THi is set such that the signal goes beyond the threshold THi within a required response time (e.g., about 0.2 s) after the start of a fall.

Figure 3A:
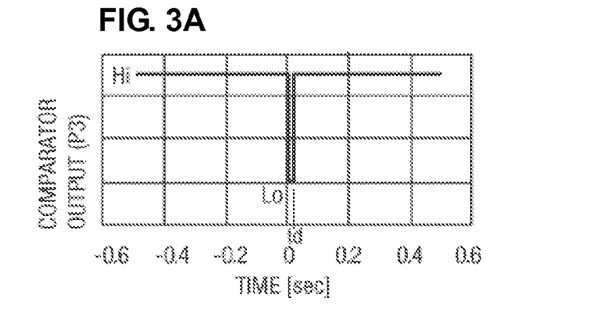
FIGS. 3A to 3D include charts of waveforms obtained at the elements shown in FIG. 1 at the time the device is falling.
Figure 3B:
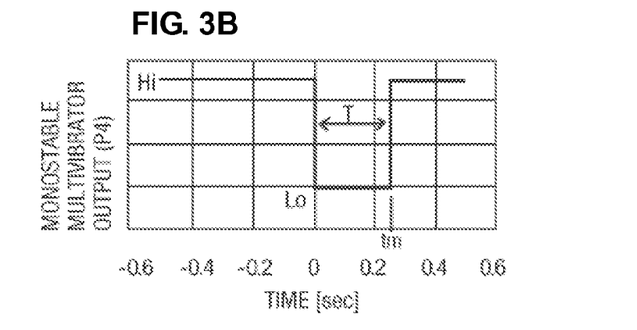

FIG. 3A shows the waveform of the output signal P3 of the comparator 3 shown in FIG. 1, and FIG. 3B shows the waveform of the output signal P4 of the monostable multivibrator 4. The output signal P3 of the comparator 3 is at the low level for a time period in which, as shown in FIG. 2C, the differential signal P2 is beyond the threshold THd. The output signal P4 of the monostable multivibrator 4 rises at time tm after a predetermined time period T after the output signal P3 of the comparator 3 has fallen.

Figure 3C:
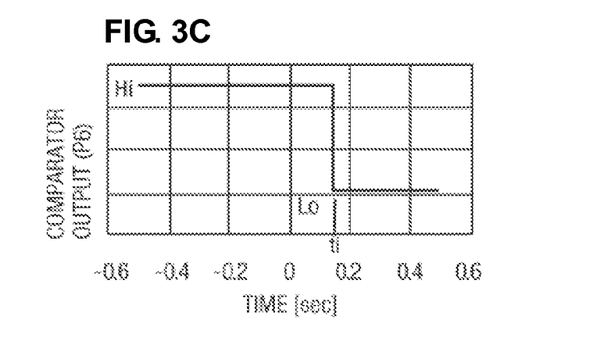

FIG. 3C is a waveform chart of the output signal P6 of the comparator 6 shown in FIG. 1. As shown in FIG. 2D, the integrated signal P5 goes beyond the threshold THi at ti, and thus, the output signal P6 of the comparator 6 is inverted to the low level (Lo) at this time ti.

Figure 3D:
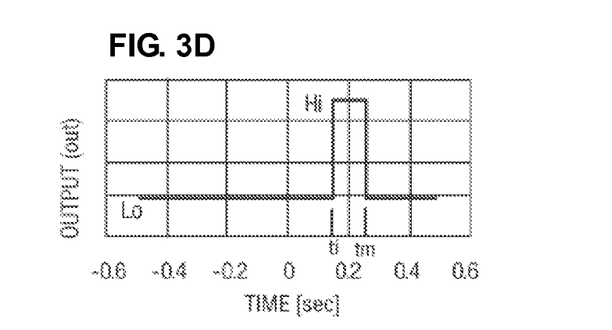

FIG. 3D is a waveform chart of the output signal out of the fall determination processor 7 shown in FIG. 1. The fall determination processor 7 functions as a positive logic NOR gate. When both the output signal P4 of the monostable multivibrator 4 and the output signal P6 of the comparator 6 are at the low level (Lo), the fall determination processor 7 outputs a high level. Therefore, as shown in of FIG. 3D, the fall determination processor 7 outputs a signal that rises, after the device has started falling at 0, at time ti and falls at tm. The generation of this high level indicates that a fall has been detected. Therefore, an apparatus using this fall detection device takes appropriate measures against a fall when the output signal out rises.

In the example shown in FIGS. 2A to 2D and FIGS. 3A to 3D, for the sake of the description, it has been regarded that the acceleration is only in one direction. However, since the output signal P1 of the acceleration sensor 1 is bipolar, two falling directions are detectable. Therefore, the threshold THd of the comparator 3 is provided as both positive and negative thresholds. Similarly, the threshold THi of the comparator 6 is provided as both positive and negative thresholds.

As shown in FIG. 2B, at the time the device starts falling, the output signal P1 of the acceleration sensor 1 rises and immediately thereafter decreases gradually because of the low-frequency cutoff characteristics of the acceleration sensor 1. The low-frequency cutoff is set to a frequency as low as possible such that there will be substantially no change in output within a desired detection time (when converted to a fall distance L, $L=\frac{1}{2}G \cdot t^2$). In this example, the low-frequency cutoff is about 0.4 Hz. Here, G represents the acceleration of gravity, and t represents the response time needed to detect a fall after the start of the fall.

Acceleration applied to the acceleration sensor 1 at times other than during falls includes a shock applied when an apparatus including the fall detection device collides with another object. The operation of the fall detection device in this case will be described with reference to FIGS. 4A to 4F.

Figure 4A:
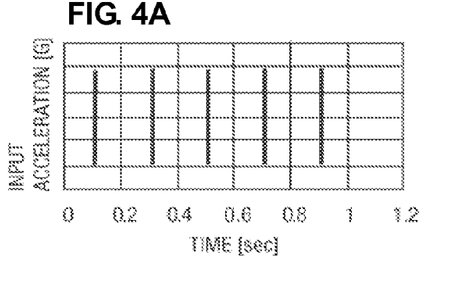
FIGS. 4A to 4F include charts of waveforms obtained at the elements shown in FIG. 1 at the time a shock is applied to the device.

FIG. 4A shows the input acceleration in response to the above-described shock. This acceleration is burst acceleration, which oscillates in positive and negative directions around 0 [G] and which is repeated in a cycle of about 0.2 s.

Figure 4B:
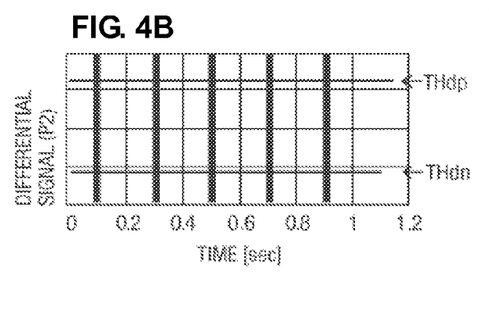

FIG. 4B is a waveform chart of the differential signal P2 of the differentiator 2. Since the input acceleration is a large acceleration that goes beyond ±2 G, a differential signal thereof goes beyond the negative threshold THdn or the positive threshold THdp at each time.

Figure 4C:
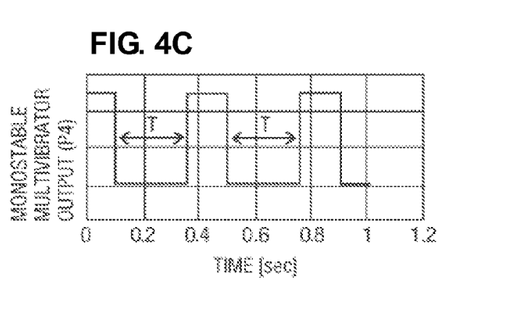

FIG. 4C is a waveform chart of the output signal P4 of the monostable multivibrator 4. Every time the differential signal P2 goes beyond the threshold THdn or THdp, the output signal P3 of the comparator 3 has a waveform inverted between the high level and the low level. Time period T in which the output signal P4 of the monostable multivibrator 4 is at the low level is not less than one waveform output by the monostable multivibrator 4, and the output signal P4 has the waveform shown in FIG. 4C.

Figure 4D:
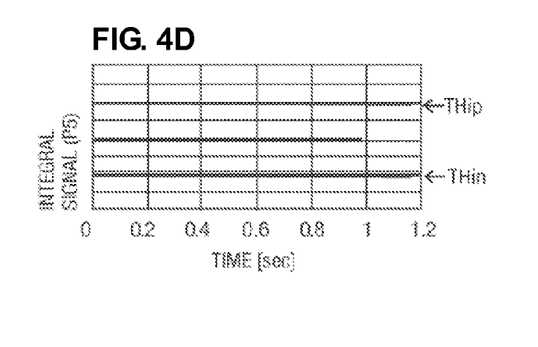
Figure 4E:
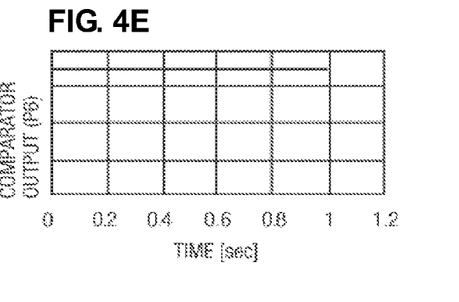

In contrast, the integrated signal P5 of the integrator 5 is maintained at substantially 0, as shown in FIG. 4D, and thus, does not go beyond the threshold THin or THip. Therefore, the output signal P6 of the comparator 6 is maintained at the high level, which is the normal state, as shown in FIG. 4E.

Figure 4F:
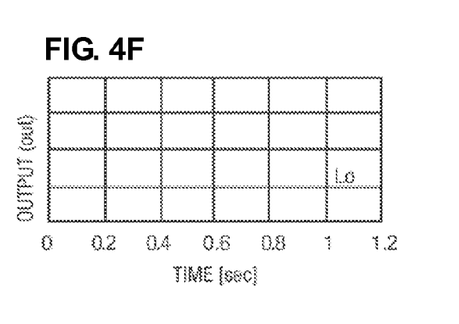

FIG. 4F is a waveform chart of the output signal out of the fall determination processor 7. Since the output signal P6 of the comparator 6 is maintained at the high level, the output signal out remains at the low level (Lo). Therefore, the fall determination processor 7 correctly detects that the device is not falling.

Acceleration applied to the acceleration sensor at times other than falls additionally includes the motion of a user of the device. An exemplary case will be described on the basis of FIGS. 5 and 6A to 6F.

Figure 5:
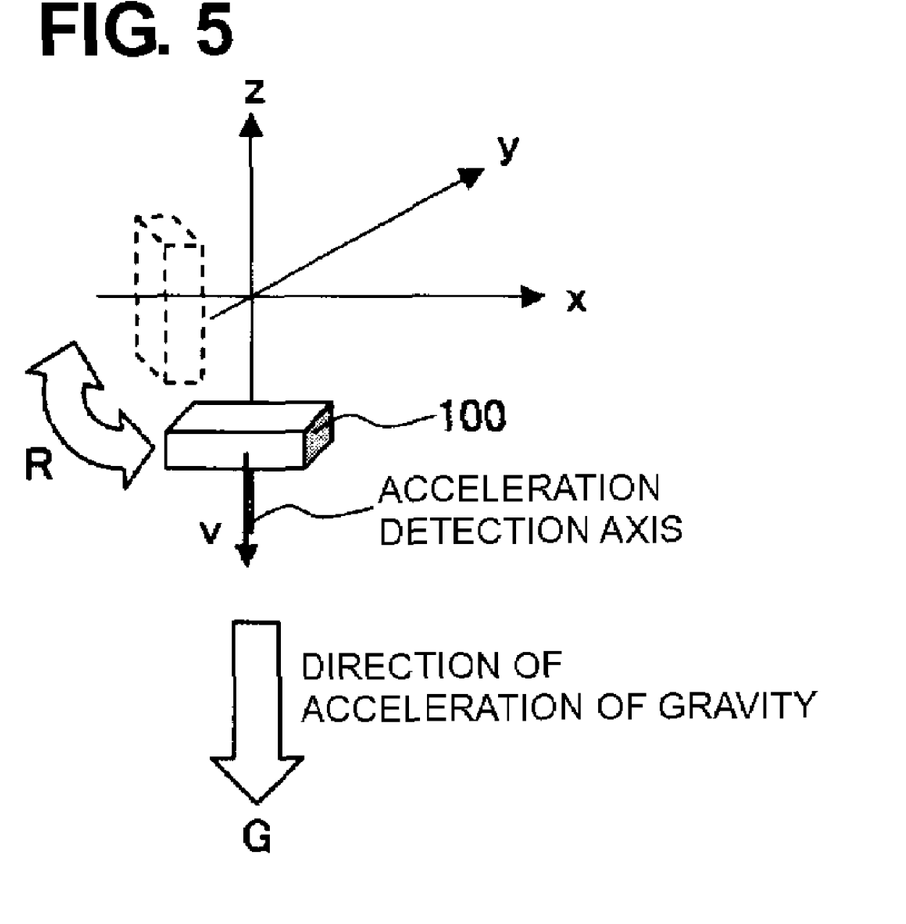
FIG. 5 is a diagram showing an example of motion applied by a user.

FIG. 5 shows an example in which a 90° repetitive motion indicated by arrow R is applied to a fall detection device 100 or an apparatus including the same. An acceleration detection axis z of the fall detection device 100 is directed along a vertical direction v, and two axes x and y that perpendicular or substantially perpendicular to the z-axis are directed toward a horizontal surface. Also, G represents the direction of acceleration of gravity.

Figure 6A:
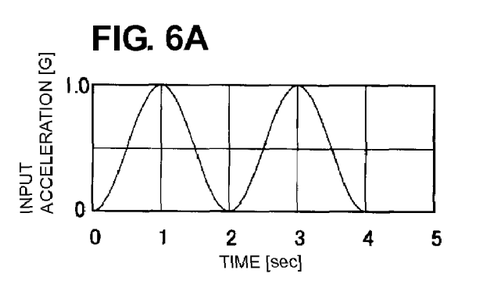
FIGS. 6A to 6F include charts of waveforms obtained at the elements shown in FIG. 1 in response to the motion.

Under these circumstances, FIG. 6A is a waveform chart of the input acceleration applied to the acceleration sensor 1. When the fall detection device 100 shown in FIG. 5 is in a state indicated by solid lines, the input acceleration is about 1.0 [G]; when the fall detection device 100 is in a stationary state indicated by broken lines, the acceleration of gravity is about 0 [G]. As shown in FIG. 6A, an acceleration of about 1 Gpp is applied.

Figure 6B:
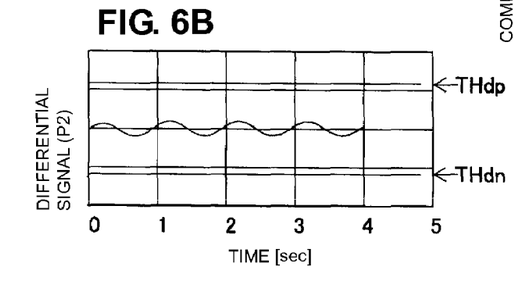

FIG. 6B is a wave form chart of the output signal (differential signal) P2 of the differentiator 2. Unlike during a fall, when the applied acceleration changes gradually in this manner, the differential signal changes less and does not go beyond the threshold THdn or THdp.

Figure 6C:
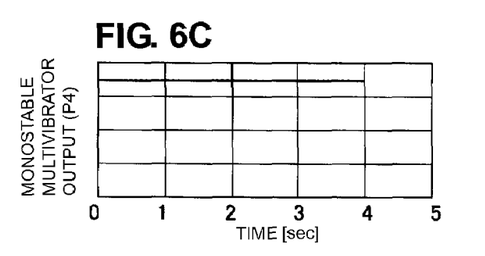

FIG. 6C is a waveform chart of the output signal P4 of the monostable multivibrator 4. Since the output signal P3 of the comparator 3 is maintained at the high level, the output signal P4 of the monostable multivibrator 4 is maintained at the high level in this manner.

Figure 6D:
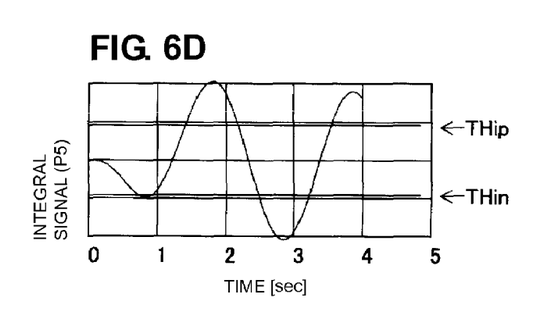

FIG. 6D is a waveform chart of the output signal (integrated signal) P5 of the integrator 5. When the input acceleration changes gradually in this manner, the integrated signal P5 also changes gradually and significantly and goes beyond the threshold THin and THip.

Figure 6E:
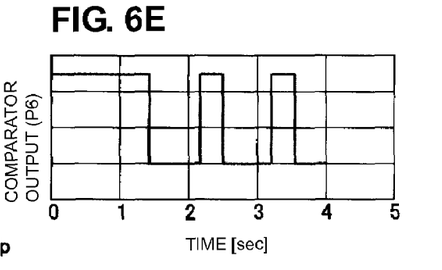
Figure 6F:
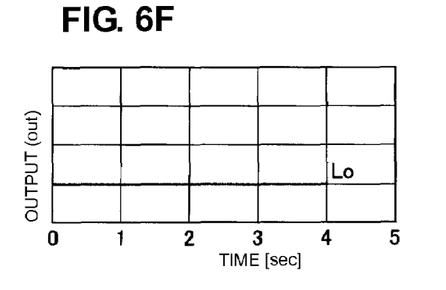

FIG. 6E is a waveform chart of the output signal P6 of the comparator 6. The output signal P6 is at the low level for a period in which, as shown in FIG. 6D, the integrated signal P5 goes beyond the threshold THin or THip. However, as described above, the output signal P4 of the monostable multivibrator 4 remains at the high level, and thus, the output signal out of the fall determination processor 7 is maintained at the low level, as in part FIG. 4F. In other words, the fall determination processor 7 determines that the device is not falling and outputs a correct detection result.

Next, a fall detection system according to a second preferred embodiment will be described with reference to FIGS. 7A and 7B.

Figure 7A:
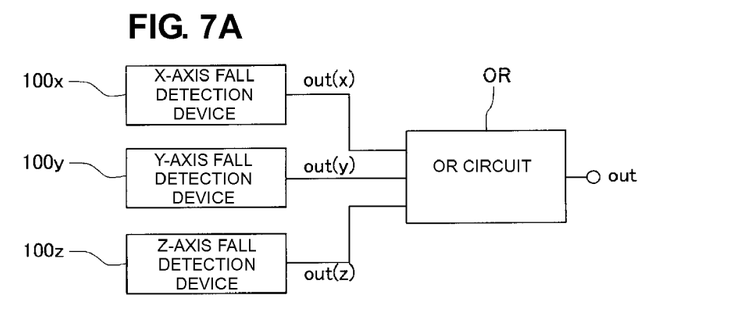
FIGS. 7A and 7B include a diagram of the overall structure of a fall detection system according to a second preferred embodiment of the present invention and a diagram of the placement relationship among three fall detection devices.

FIG. 7A is a block diagram of the overall structure of the fall detection system. An x-axis fall detection device $100x$ is a fall detection device in which the acceleration detection direction of its built-in acceleration sensor is directed along the x-axis. A y-axis fall detection device $100y$ is a fall detection device in which the acceleration detection direction of its built-in acceleration sensor is directed along the y-axis. A z-axis fall detection device $100z$ is a fall detection device in which the acceleration detection direction of its built-in acceleration sensor is directed along the z-axis. The structure of each of the three fall detection devices $100x$, $100y$, and $100z$ is similar to that shown in FIG. 1. An OR circuit OR is a logic circuit that outputs a logical-OR signal of output signals out(x), out(y), and out(z) of the three fall detection devices $100x$, $100y$, and $100z$.

Figures 7B, 8:
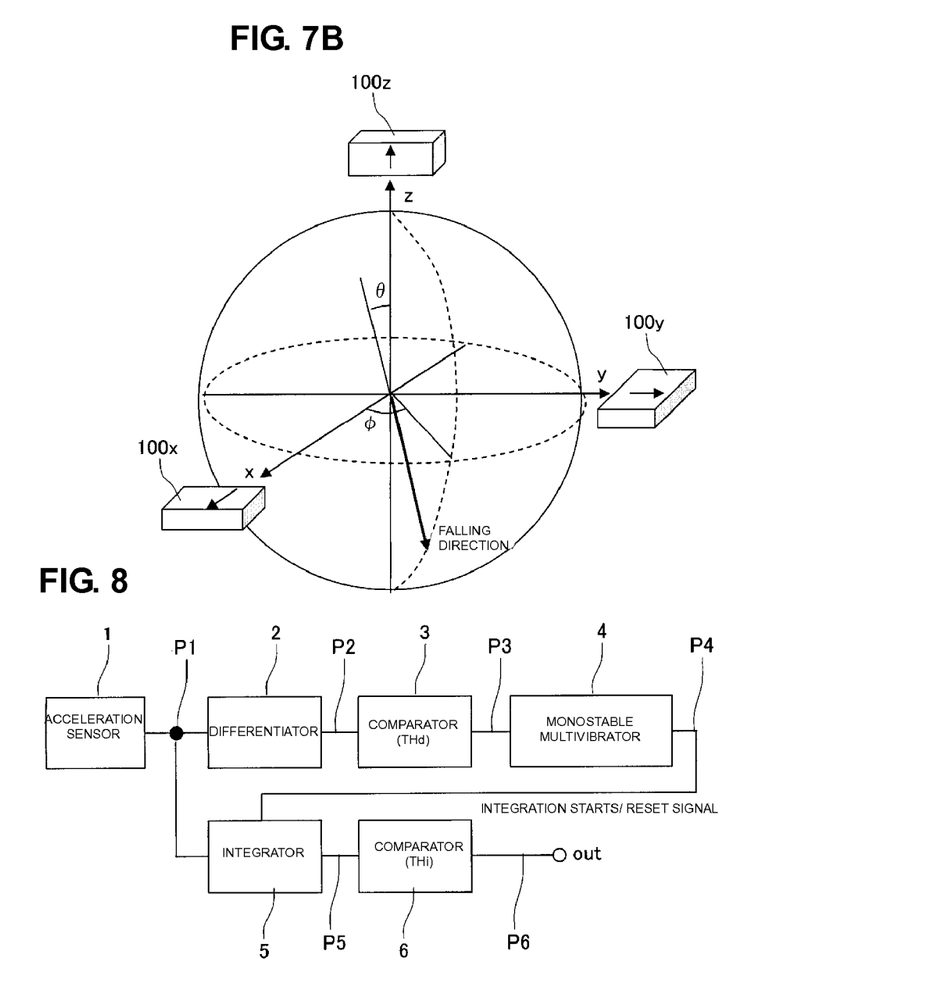
FIG. 8 is a block diagram of the structure of a fall detection device according to a third preferred embodiment of the present invention.

FIG. 7B is a diagram of the placement relationship among the above-described three fall detection devices $100x$, $100y$, and $100z$. Let φ be a displacement in a horizontal plane in the falling direction, and θ be a tilt relative to the z-axis (vertical), accelerations applied to the acceleration sensors of the three fall detection devices are expressed as follows:

$Gx=1G\times|\sin\theta\cdot\cos\phi|$ $Gy=1G\times|\sin\theta\cdot\sin\phi|$ $Gz=1G\times|\cos\theta|$ where G is the acceleration of gravity. Let Gmax be the maximum of Gx, Gy, and Gz, the falling direction in which Gmax is the smallest is (θ, φ)=(±54.7°, ±45°), (±54.7°, ±135°), (±125.3°, ±45°), and (±125.3°, ±135°), and Gmax in these cases is 0.577 G. This corresponds to step wise application of acceleration ranging from 0.577 G to 0 G to any of the x-, y-, and z-axis acceleration sensors regardless of any falling direction.

Therefore, the threshold THd of each comparator 3 of the fall detection devices $100x$, $100y$, and $100z$ is set to be equal to or less than the maximum differential signal generated in response to the stepwise application ranging from 0 G to about 0.577 G. Also, the threshold THi of each comparator 6 is set to be equal to or less than an integrated signal after time t has passed since the stepwise application ranging from 0 G to about 0.577 G. In this case, time t is the maximum response time for detecting a fall in which the instant of the fall serves as 0 [s].

By setting the thresholds THd and THi of the comparators 3 and 6 in this manner, falls in all directions can be accurately detected.

In the above example, for the sake of the description, it is assumed that the acceleration is applied only in one direction, and the thresholds of the comparators 3 and 6 are set. Actually, however, bipolar acceleration or acceleration applied in two directions is detected, the thresholds of the comparators 3 and 6 are set for two polarities, as in the examples shown in FIGS. 4A to 4F and FIGS. 6A to 6F.

In the second preferred embodiment, three fall detection devices are arranged such that the axes of the acceleration sensors are directed along three axes that are perpendicular or substantially perpendicular to one another. However, when falls in a specific direction need not be detected, fall detection devices may be arranged along two perpendicular or substantially perpendicular axes such that an insensitive axis is along the specific direction. For example, when specific measures need not be taken against falls in the y-axis direction shown in FIG. 7B, the fall detection device $100y$ is not provided, and only the remaining two fall detection devices $100x$ and $100z$ are provided. In this case, although falls within a conical range having a predetermined angle spreading around the y-axis direction cannot be detected, falls in other directions within the remaining wide range are detectable.

Next, the structure of a fall detection device according to a third preferred embodiment will be described with reference to FIG. 8.

This fall detection device integrates an acceleration detection signal for a predetermined period of time after an acceleration differential signal has gone beyond a predetermined threshold and determines that the device is falling in the case that the integrated signal goes beyond a predetermined threshold.

Referring to FIG. 8, an acceleration sensor 1 outputs a voltage signal in accordance with acceleration. A differentiator 2 outputs a differential signal P2 of an output signal P1 of the acceleration sensor 1. A comparator 3 compares the differential signal P2 with a predetermined threshold THd set in advance and, when the differential signal P2 goes beyond the threshold THd, inverts the state of an output signal P3. A monostable multivibrator 4 outputs a signal P4 that maintains its state for a predetermined period of time after the time at which the state of the output signal P3 of the comparator 3 is inverted from a normal state. An integrator 5 integrates the output signal P1 of the acceleration sensor 1 twice and outputs an integrated signal P5. A comparator 6 compares the integrated signal P5 of the integrator 5 with a predetermined threshold THi set in advance, and, when the integrated signal P5 goes beyond the threshold THi, inverts the state of an output signal P6. The output signal out of the comparator 6 is a fall detection signal.

The operation shown in FIG. 8 will be described with reference to FIGS. 2A to 2D. A fall starts at time 0, and, as shown in FIG. 2C, the differential signal P2 of the differentiator 2 suddenly decreases and goes beyond the threshold THd. As shown in FIG. 3A, the output signal P3 of the comparator 3 reaches the low level at substantially the same time as the device starts falling. Therefore, the output P4 of the monostable multivibrator 4 is maintained at the low level for a predetermined period of time T, as shown in part FIG. 3B. In contrast, the waveform of the integrated signal P5 of the integrator 5 changes, as shown in FIG. 2D. When the integrated signal P5 goes beyond the threshold THi during the time T of the monostable multivibrator 4, the level of the output out is changed to the high level, as shown in FIG. 3D. Thereafter, when the output P4 of the monostable multivibrator 4 returns to the high level at time Tm, the integrator 5 is reset thereby, and the output of the comparator 6 returns to the low level. Therefore, the waveform of the output out is substantially the same as that shown in FIG. 3D.

The fall detection device according to the third preferred embodiment is different from the fall detection device according to the first preferred embodiment in terms of the following advantages.

That is, with the structure shown in FIG. 1, the integrator 5 always integrates the output signal P1 of the acceleration sensor 1 twice with a predetermined time constant. In contrast, with the structure shown in FIG. 8, the integrator 5 integrates the output signal P1 of the acceleration sensor 1 for a period of time in which the output signal P4 of the monostable multivibrator 4 is being output (low-level period), and resets the integrating operation at the time the output signal P4 of the monostable multivibrator 4 returns to the high level. Thus, when, as shown in part FIG. 6A, acceleration changes due to low-frequency oscillation or rotation caused by motion of a user of an apparatus including the fall detection device, with the structure shown in FIG. 1, the integrated signal P5 of the integrator 5 changes significantly, as shown in FIG. 6D. As a result, the comparison results obtained by the comparator 6 comparing the integrated signal are at the low level (active state) for most of the time, as shown in FIG. 6E. If a shock, as shown in FIG. 4A, is applied in such a state, the output of the monostable multivibrator 4 is changed to the low level at that time. As a result, this is falsely detected as a fall. In contrast, with the structure shown in FIG. 8, the integrating operation is performed for a predetermined period of time (monostable time of the monostable multivibrator 4) after the differential signal P2 of the differentiator 2 has crossed the threshold THd, and the integrated output increases only during that time. Accordingly, the above-described false detection is reliably avoided.

Next, a magnetic disk drive according to a fourth preferred embodiment will be described with reference to FIG. 9.

Figure 9:
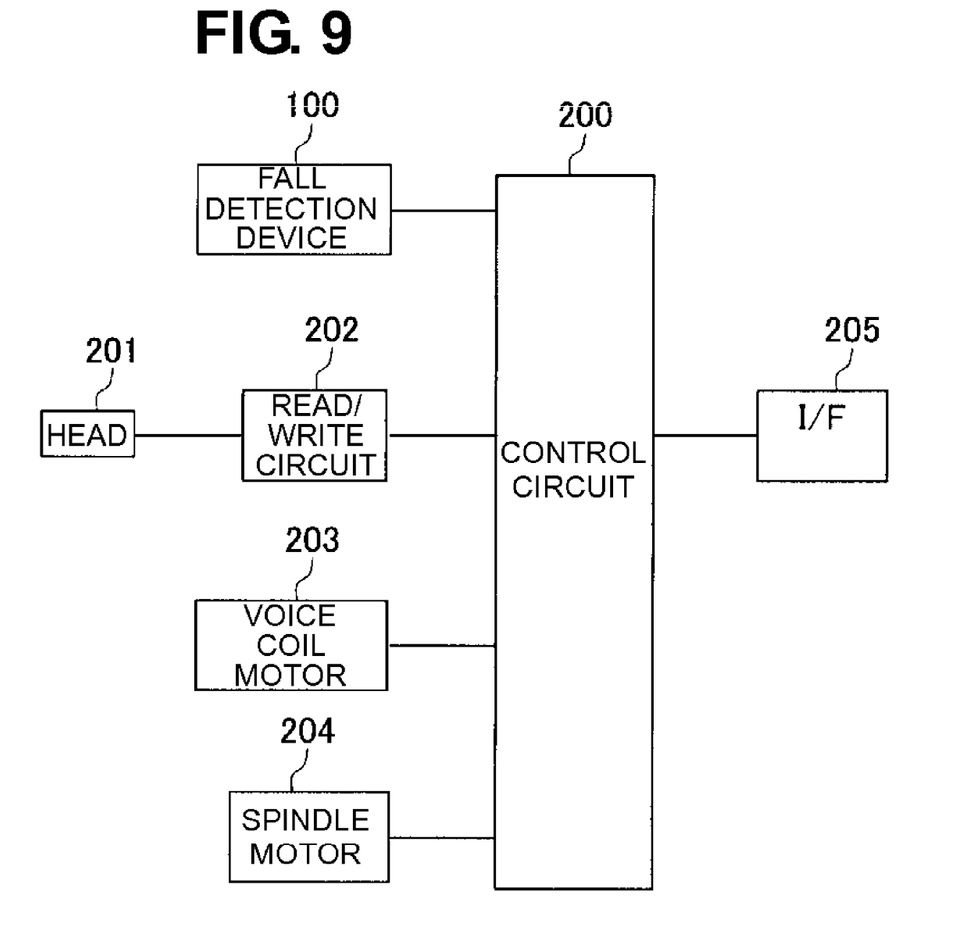
FIG. 9 is a block diagram of the structure of a magnetic disk drive according to a fourth preferred embodiment of the present invention.

FIG. 9 is a block diagram of the structure of a magnetic disk drive, such as a hard disk drive. A read/write circuit 202 reads/writes data from/to tracks on a magnetic disk using a head 201. A control circuit 200 controls reading/writing of data via the read/write circuit 202 and communicates the read/written data with a host device via an interface 205. The control circuit 200 controls a spindle motor 204 and a voice coil motor 203. The control circuit 200 reads a fall detection signal generated by a fall detection device 100, and, in the case of a fall, controls the voice coil motor 203 to evacuate the head 201 to an evacuation area. Accordingly, in a mobile apparatus including the hard disk drive falls, the head is evacuated from the magnetic disk area to the evacuation area before the mobile apparatus hits (collides with) the ground. Therefore, a recording surface of the magnetic disk is prevented from being damaged by contact with the head 201.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A magnetic disk drive comprising:
    a fall detection device;
    a head that reads or writes data relative to a magnetic disk; and a head evacuation unit arranged to evacuate the head to an evacuation area when the fall detection device detects a fall;
    wherein the fall detection device comprises:
    an acceleration sensor that outputs an output signal in accordance with acceleration;
    a differentiator arranged to differentiate the output signal of the acceleration sensor;
    an integrator arranged to integrate the output signal of the acceleration sensor; and
    a state determination processor arranged to determine a fall when the output signal of the acceleration sensor is in a specific state in which a differential signal from the differentiator goes beyond a predetermined threshold and an integrated signal obtained by the integrator goes beyond a predetermined threshold; wherein
    the integrator starts integration at a time when the differential signal from the differentiator goes beyond the predetermined threshold.

2. The magnetic disk drive according to claim 1, wherein three acceleration sensors are arranged such that acceleration detection directions thereof are directed along three axes that are substantially perpendicular to one another, the state determination processor determines whether each of the output signals of the three acceleration sensors is in the specific state; and
    the fall detection device further comprises a detection result output processor arranged to output a signal indicating a fall when the state determination processor determines that any one of the output signals of the three acceleration sensors is in the specific state.

3. The magnetic disk drive according to claim 1, wherein the integrator performs integration at least once.

4. The magnetic disk drive according to claim 1, wherein the integrator performs integration twice.

5. The magnetic disk drive according to claim 1, wherein the acceleration sensor is a piezoelectric acceleration sensor that generates a piezoelectric effect in response to stress according to the acceleration.

6. The fall detection device according to claim 5, wherein a monostable multivibrator which maintains a state of an output signal of the differentiator for a predetermined period of time is provided at a subsequent stage of the differentiator, and the predetermined period of time is a monostable time of the monostable multivibrator.

7. The magnetic disk drive according to claim 1, wherein the integrator performs integration for a predetermined period of time after the differential signal has gone beyond the predetermined threshold.

* * * * *